United States Patent [19]
Espenshied

[11] 3,752,282
[45] Aug. 14, 1973

[54] CLUTCH WITH PLURAL FLUID RELEASING MEANS

[75] Inventor: Helmut Espenshied, Ludwigsburg-Pflugfelden, Germany

[73] Assignee: Robert Basch GmbH, Stuttgart, Germany

[22] Filed: Feb. 1, 1972

[21] Appl. No.: 222,485

[30] Foreign Application Priority Data
Feb. 3, 1971 Germany.................. P 21 04 934.3

[52] U.S. Cl................ 192/91 R, 192/83, 192/3.58, 60/54.5 R, 60/54.5 P, 200/81.5
[51] Int. Cl............................................. F16d 25/08
[58] Field of Search............................ 192/83, 91 R

[56] References Cited
UNITED STATES PATENTS
2,753,024   7/1956   Weaving et al................... 192/83 X
3,292,751  12/1966   McRay et al.................. 192/91 R X

*Primary Examiner*—Benjamin W. Wyche
*Attorney*—Michael S. Striker

[57] ABSTRACT

A clutch pedal is connected by a master cylinder and clutch cylinder through an operating valve with the clutch of a motor car so that the clutch can be disengaged and engaged by an operator before shifting the gear transmission. By operation of electromagnetic control valves, a source of pressure fluid can be connected with the operating valve to operate the same to supply pressure fluid to the clutch cylinder without operation of the clutch pedal. The control valves have another position in which the source of pressure fluid is disconnected while fluid is discharged through the control valves into a low pressure region by a spring-biased piston of the operating valve. The operating piston moves first rapidly, and then slowly while fluid is discharged from the operating cylinder through a throttle, and the clutch performs a corresponding movement first quickly and then slowly to the engaged position as required for shifting to a higher gear. Control means electrically control the electromagnetic control valve for automatic operation of the clutch during up and down shifting of the transmission.

10 Claims, 2 Drawing Figures

Patented Aug. 14, 1973 3,752,282

CLUTCH WITH PLURAL FLUID RELEASING MEANS

BACKGROUND OF THE INVENTION

The present invention relates to control apparatus for actuating the friction clutch of a motor car having a shiftable gear transmission. The clutch pedal operates a master cylinder and piston device which communicates with a clutch cylinder and piston device operating the clutch.

Clutch control devices of this type have a simple construction, but have the disadvantage that they have to be operated by the drive of the motor car for shifting the transmission to a higher or lower stage. The frequent operation of the spring-biased clutch pedal is not only tiring for the driver, but proper operation of the clutch during up and down shifting depends on the skill of the driver.

SUMMARY OF THE INVENTION

It is one object of the invention to overcome the disadvantages of known control apparatus for the clutch of a motor car, and to provide a clutch control apparatus which controls the clutch operation in such a manner that smooth gear shifting is obtained.

Another object of the invention is to provide a hydraulic control apparatus which operates the clutch as required for shifting to a higher gear stage or to a lower gear stage.

With these objects in view, an operating valve is connected with the master cylinder of the clutch pedal and with the clutch cylinder of the clutch, and controls the flow into the clutch cylinder. The operating valve can be actuated from the master cylinder, but also by control valve means which are automatically operated to connect the operating valve either to a low pressure region, or to a source of pressure fluid by which the operating valve is actuated to control the clutch by means of the clutch cylinder. In order to achieve a slow return of the clutch to the engaged position, fluid from the operating valve can also be automatically discharged through a throttle.

The control apparatus of the invention makes it possible to quickly disengage the clutch when shifting to a higher gear, and to permit the clutch to engage with a predetermined speed. When the gear transmission is to be shifted from a high gear stage to a low gear stage, the clutch is quickly reengaged after disengagement and changing of the gears without operation of the clutch pedal by the driver. The driver controls the clutch operation only during shifting from neutral to the first gear stage, and then preselects upshifting or downshifting of the gear stages whereupon the clutch is automatically operated at the required speed. In this manner, an optimal clutch operation is obtained, which is independent of the skill of the driver, and the time required for shifting the transmission and disengaging and engaging the clutch is very short.

The arrangement is such that the automatic operation can be overruled at any time by the driver operating the clutch pedal.

A clutch control apparatus for a motor car in accordance with a preferred embodiment of the invention, comprises clutch means biased to an engaged position; a clutch cylinder and a clutch piston for moving the clutch means to a disengaged position; operator controlled biased clutch actuating means, such as the pedal; a master cylinder and a master piston operated by the clutch actuating means; operating valve means including biased operating pistons, and operating cylinder means communicating with said master cylinder and said clutch cylinder so that upon operation of the master piston by said clutch actuating means, said clutch piston operates said clutch means to said disengaged position; a source of pressure fluid, such as a pump; control valve means, preferably including two control valves, having a normal position disconnecting the pressure source from the operating cylinder means and connecting the latter with a low pressure region, and a first control position connecting the source of pressure with the operating cylinder means so that said biased operating piston means rapidly presses fluid into said clutch cylinder for rapidly disengaging the clutch means; and control means for moving the control valve means to the first controlled position for disengaging the clutch means, and then to the normal position so that low pressure in the operating cylinder permits the biased operating piston to draw fluid from the clutch cylinder so that the clutch means moves rapidly to the engaged position.

In the preferred embodiment, the apparatus comprises a relief throttle, and the control valve means have a second controlled position connecting the operating cylinder means with the relief throttle so that the clutch means moves slowly to the engaged position. The control means includes electronic means, and switch means operated by the operating piston means and electrically connected with electromagnetic shifting means of the control valve means so that the latter are shifted between the normal position and first and second control positions.

The apparatus comprises a selector lever which is manually operated between a first selecting position for shifting to a higher gear, a second neutral position, and a third selecting position for shifting to a lower gear. Selector switches are actuated by the selector lever and connected with the control means so that the control means move the control valve means from the first controlled position only to the normal position when the selector lever is in the third position, and successively move said control valve means to the normal and second controlled position when the selector lever is in the first selecting position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
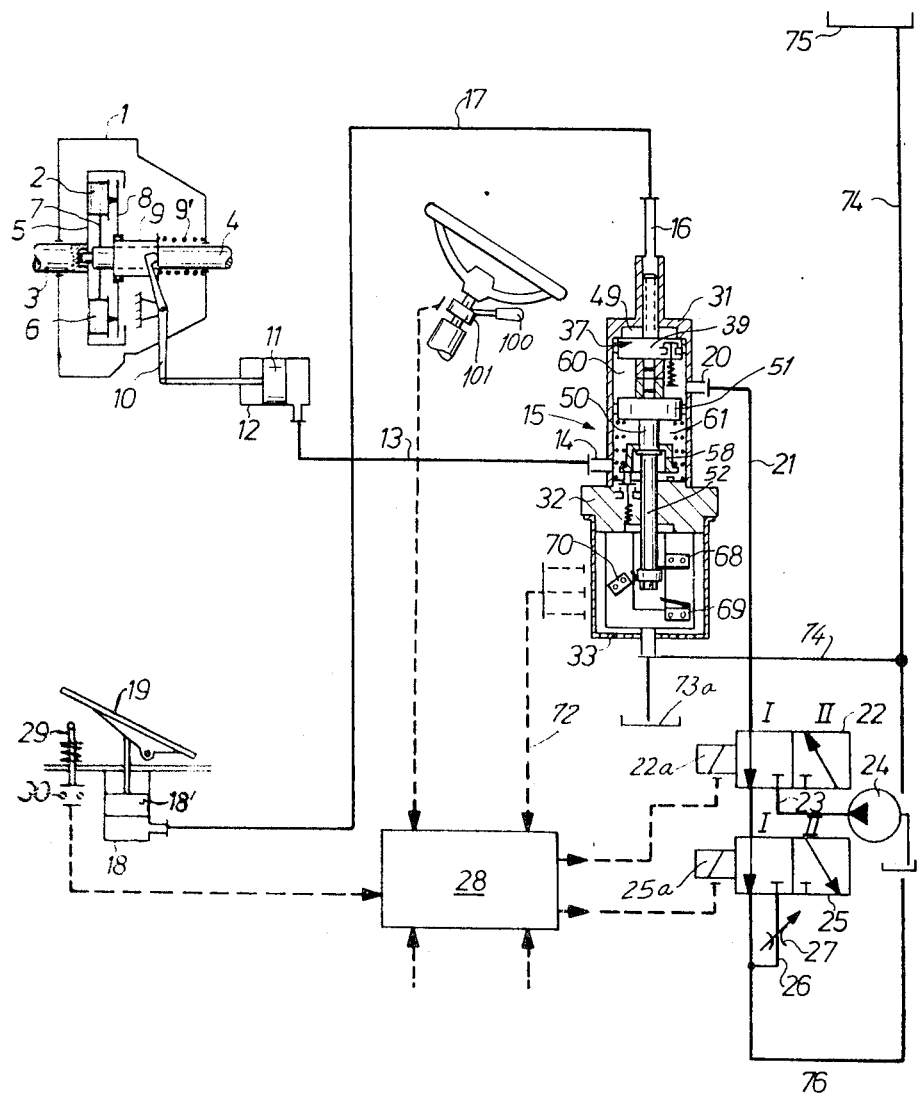
FIG. 1 is partly a schematic view, and partly a diagram illustrating an embodiment of a control apparatus of the invention, partially in section.

Referring first to FIG. 1, a friction clutch 2 connects a drive shaft driven by a combustion engine, not shown, with an output shaft 4 connected with the input shaft of a gear transmission, not shown. A pot-shaped clutch member 5 is secured to drive shaft 3 and have a friction lining 6. The output shaft 4 carries a coupling disk 7 which is operable by a pressure plate 8 which is operated by a sleeve 9 mounted on output shaft 4 for axial movement, and is biased by a spring 9' toward the pressured plate 8. A double armed lever 10, mounted on a stationary portion of housing 1 for angular movement, engages a flange of sleeve 9, and is operable by a clutch piston 11 when fluid is supplied into the clutch cylinder 12 through a conduit 13 leading to an opening in a housing part 31 of an operating valve 15. When fluid such as oil flows into clutch cylinder 12, the clutch 2 is disengaged against the action of spring 9' which tends to engage clutch 2. When fluid is permitted flow out of clutch 12 into operating valve 15, spring 9' moves clutch 2 to an engaged position.

The cylinder housing portion 31 of operating valve 15 has an opening 16 which communicates through a conduit 17 with the master cylinder 18 in which a master piston 18' is located, connected by a link with a clutch pedal 19, so that upon depression of the clutch pedal 19, fluid is pressed out of master cylinder 18 and into the opening 16 of the operating valve housing portion 31.

Housing portion 31 of operating valve 15 has a further opening 20 connected by conduit 21 with a schematically illustrated first control valve 22 which has two positions I and II between which control valve 22 is shifted by electromagnetic shifting means 22a under the control of electronic control means 28, schematically shown in FIG. 1. A second control valve 25 has also two positions I and II, and can be shifted between the two positions by electromagnetic shifting means 25a, also controlled by control means 28.

A switch 30 is spring biased and controlled by an actuator which is engaged by clutch pedal 19 when the same is depressed by the driver. Swtich 30 is also electrically connected with control means 28. Furthermore, three switches 68, 69, 70 are enveloped by another housing portion 33 of operating valve 15, and electrically connected with control means 28. Finally, a selector lever 100, mounted on the steering wheel of the car, controls three selector switches 101 which are connected with the control means 28. Selector lever 100 has three positions, namely a first selecting position to which it is set when automatic shifting to a higher gear stage is desired, a second neutral position, and a third selecting position when shifting to a lower gear stage is desired. Respective selector switches, schematically shown at 101, are actuated in the three position of selector lever 100, and influence the electronic means in the control means 28 accordingly, as indicated by a broken line.

The schematically illustrated control means 28 are not an object of the invention, and are disclosed inn detail in the copending application Ser. No. 162,334, filed July 14, 1971, and being assigned to the same assignee as the present application.

The description of the electronic control means 28 in the copending application is so lengthy, that an inclusion of such a description into the present application does not seem advisable, particularly since the control means 28 are not an object of the present invention. Briefly, control device 28 has inputs, receiving signals from operator-controlled means, and outputs connected with the inputs by synchronizing circuits and switching logic so that synchronized output signals control the functions of the transmission, not shown, and particularly thee shifting of clutch 2 by clutch piston 11.

Referring again to the control valve means 22, 25, in the illustrated normal position, conduit 21 is connected through control valve 22 and control valve 25 in the positions I with a conduit 76 which leads to aa low pressure region so that fluid from the chamber 60 of the operating valve 15 can be quickly discharged.

When control valve 22 is shifted to the first control position II, a source of pressure fluid, such as a pump 24, is connected by conduit 23 and control valve 22 with conduit 21 so that pressure fluid is pressed through opening 20 into pressure chamber 60. When control valve 25 is shifted to the second control position II thereof, the conduit 21 is connected with a throttle 27 in a conduit 26 so that pressure fluid from pressure chamber 60 is discharged through conduit 21, control valve 22 in position I, and control valve 25 in position II through throttle 27 and conduit 76 to a low pressure region. The low pressure region may be represented by a container 73a from which pump 24 draws a liquid.

Figure 2:
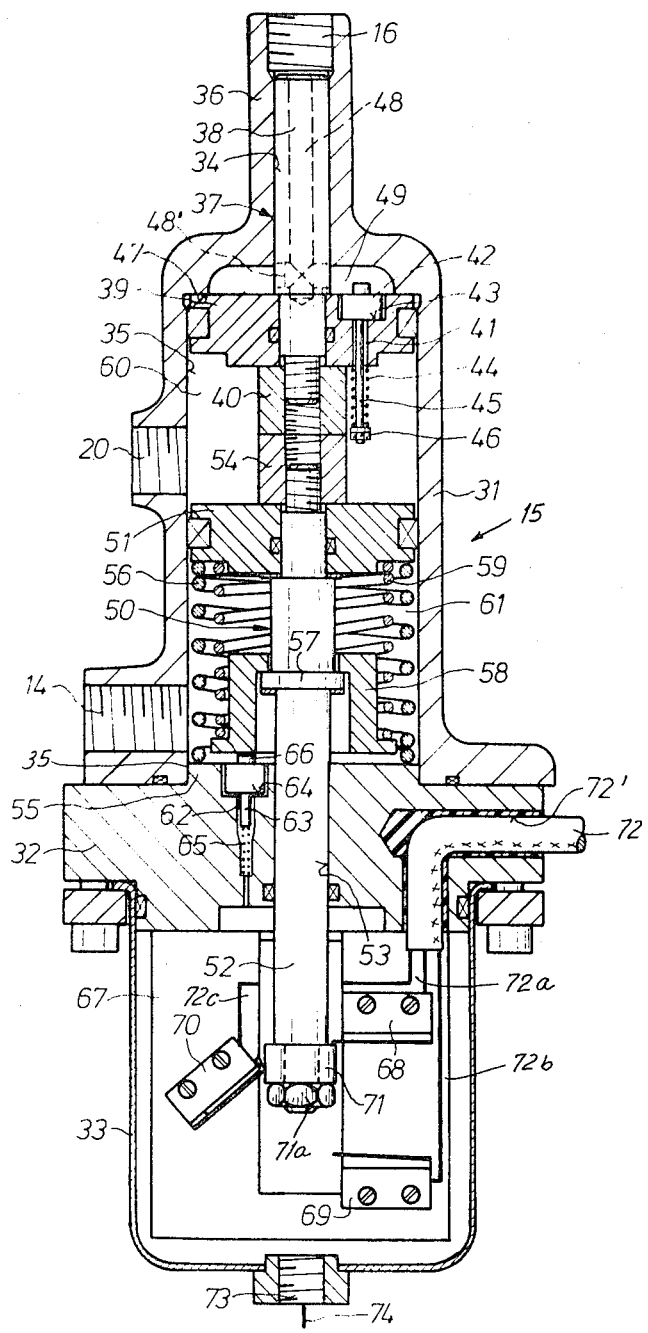
FIG. 2 is an axial sectional view illustrating on an enlarged scale, operating valve means used in the embodiment of FIG. 1.

Referring now mainly to FIG. 2, which illustrates the operating valve 15, the housing of operating valve 15 includes an upper housing portion 31, a central housing portion forming a transverse wall at the lower end of the upper housing portion 31, and a lower housing portion 33 having an outlet 73 communicating with a conduit 74 which ends in a container 75 located above operating valve 15, while another conduit opens into a lower container 73a.

The upper housing part 31 has a stepped bore including a narrow bore portion 34, and a wider bore portion 35. The upper bore portion 34 is provided in a tubular narrow neck portion 36 of housing portion 31. The three housing portions 31, 32 and 33 have flanges secured to each other by nut and bolt means 32a.

In the stepped bore 34, 35, a stepped operating piston 37 is slidingly guided in a fluid tight manner. The stepped operating piston 37 has an upper thin piston portion 38 guided in bore portion 34, and a lower piston portion 39 guided in bore portion 35. The piston portions 38, 39 are clamped together by a nut 40 screwed onto a threaded portion of piston portion 38.

Piston portion 39 has a stepped bore 41 in which a valve body 42 is arranged which has a stem 45 with a washer and nut 46 at the end, and is biased by a spring 44 to a position seated on an annular shoulder of bore 41. The end of stem 45 with nut 46 projects slightly beyond the nut 40.

When the stepped operating piston 37 is in its uppermost position, as viewed in FIG. 2, it abuts an annular shoulder 47 formed between the bore portions 34 and 35.

The upper piston portion 38 has a blind axial bore 48 ending in a radial bore 48' which opens into a first pressure chamber 49 formed by piston portion 39 and housing portion 31.

In the lower and wider cylinder bore portion 35, the piston portion 51 of a stepped piston 50 is slidably guided. The lower piston portion 52 is formed at a shaft or rod 52 guided in a bore 53 in the second transverse housing part 32. Piston rod portion 52 has an upper threaded end portion projecting from the upper piston portion 51 and being secured by a nut 54 abutting piston portion 51. The nuts 40 and 54 abut each other in the position of the operating valve 15 shown in FIG. 2.

The transverse housing portion 32 forms a transverse wall which has a boss 55 projecting axially into the wide bore portion 35 of housing portion 31. A spring ring 56 has one end abutting boss 55, and another end abutting piston portion 51 of piston 50, and exerting upward pressure on piston portion 50 so that nut 54 abuts nut 40, while piston portion 39 abuts the annular shoulder 7 in the upper housing portion 31.

Between the piston portion 39 and the piston portion 51, a second pressure chamber 60 is formed in housing portion 31 which has the opening 20 connected with conduit 21, as shown in FIG. 1. A third pressure chamber is formed between piston portion 51 and the transverse housing wall 32 and communicates with an opening 14 connected with the clutch cylinder 12 as shown in FIG. 1. In addition to spring 56, a second spring 59 is located to abut piston portion 51 at the upper end and a flange of the bushing 59 at the lower end, so that bushing 58 is biased to the illustrated position abutting a flange 57 of piston rod portion 52 which is upward biased by spring 56 together with piston portion 51.

The transverse housing wall portion 32 has a conduit passing therethrough in the form of a stepped bore 62 in which a valve body 63 is guided which cooperates with an annular seat 64 formed between the two parts of the stepped bore 62. A spring 65 urges a projection 66 of valve body 63 against the bottom face of the bushing 58. When due to upward movement of bushing 58, spring 65 can move valve body 64 upward, a passage is established between the third pressure chamber 61 and the control chamber 67 in the lower housing part 33.

Three electric switches 68, 69, 70 are mounted within the control chamber 67, which is filled with fluid. Switches 68, 69 are located spaced from each other in axial direction on one side of the control chamber 67, and the intermediate switch 70 is located on the other side of control chamber 67 so that the actuating projections 71 screwed by a nut 71a to the piston rod portion 52 operates the actuators of the switches 68, 69 and 70 when the operating piston 50 is moved. Switch 70 is substantially equidistant from switches 68 and 69 in the axial direction of operating valve 15.

The transverse housing portion 62 has an insulated channel 72' for a cable 72 which is connected with control means 28, as schematically indicated in FIG. 1, and has three connectors 72a, 72b, 72c respectively connected with switches 68, 69 and 70.

Control chamber 67 has an outlet 73 which is connected by a conduit to the containers 75 which is located higher than the highest pressure chamber 61, so that pressure chambers 61, 60 and control chamber 67 are always filled with the operating fluid. As noted above, the pressure chamber 60 is connected by opening 20 with conduit 21 which leads to the control valve means 22, 25.

OPERATION

Assuming that the combustion engine, not shown, of the motor car idles, and that the transmission, not shown, which is controlled by clutch 2, is to be shifted from neutral to the first gear stage, driver steps on clutch pedal 19, so that switch 29 closes which transmits through a wire connection, schematically indicated by broken lines, a signal to the control means 28 which disconnects the control means 28 from the voltage so that the following operations are carried out without interference of the semi-automatic control of control means 28. As the clutch pedal 19 is being depressed by the driver, pressure fluid is displaced from master cylinder 18 through conduit 17 to the opening 16 into the ducts 48, 40' in piston portion 38 and into the first pressure chamber 49 so that the stepped piston 37 moves downward, and since nuts 40, 54 abut each other, piston 50 also moves downward against the action of spring 56 so that the volume of the second pressure chamber 60 is not varied. A downward movement of pistons 50 with piston portions 51 and 52 presses the fluid in the third pressure chamber 61 out of opening 14 and through conduit 13 to the clutch cylinder 11 which disengages clutch 2 by operation of lever 10.

Due to the fact that the downward movement of piston portion 51 compresses the spring 59, bushing 58 presses against the projection 66 of valve body 63 which abuts the annular seat 64 so that no fluid can flow out of the pressure chamber 61 into the low pressure chamber 67 with the low pressure outlet opening 73.

When the clutch 2 is disengaged in this manner by an operation of the driver, the gear shift lever, not shown, is operated to shift the gear transmission from neutral to the first gear stage, whereupon the driver slowly releases the clutch pedal 19. Spring 56 acts now on piston portion 51 of the lower piston 50, and through nuts 54, 40 on the piston portion 39 of the upper stepped piston 37 so that the fluid in the first pressure chamber 49 is pressed through opening 16 and conduit 17 into the master cylinder 18 to urge the clutch pedal 19 to its normal inoperative position. At the same time, pressure fluid in clutch cylinder 12 is urged by clutch piston 11 due to the action of spring 9' to flow through conduit 13 and opening 14 into pressure chamber 61 whose volume increases due to the upward movement of piston 50 by spring 56.

When clutch pedal 19 moves to its normal inoperative position, it releases the actuator 29 of the switch 30 so that the electric control means 28 are again operative, and ready for a semi-automatic shifting operation.

Assuming that the transmission is to be shifted to the second stage, the selector lever 100 is placed in the selecting position associated with upward shifting of the transmission, the corresponding selector switch 101 is operated, and a signal is given to the control means 28.

The electronic control means 28 generates a pulse to the electromagnetic shifting means 22a of control valve 22 so that the same is shifted from the position I to the position II in which the outlet conduit 23 of the pump 24 is connected with conduit 21, opening 20, and the second pressure chamber 60 so that the pressure fluid drives the operating pistons 50, 51, 52 rapidly downward so that pressure fluid is pressed out of pressure chamber 61 through opening 14 and conduit 13 into clutch cylinder 12 so that clutch piston 11 and lever 10 disengage the clutch, without operation of the clutch pedal 19 by the driver. The second control valve 25 remains in its illustrated normal position.

The transmission of the car, not shown, is designed so that after disengagement of clutch 2, and operation of the gear shift, the gears of the two stages have to be synchronized. For properly and quickly shifting the transmission to a higher gear stage, it is desirable that the clutch very quickly moves towards the engaged position, but is slowed down during the last part of the movement to obtain a smooth engagement of the parts of the friction clutch. The clutch should move as fast as possible during the first part of the clutch engaging movement so that the clutching time is as short as possible. This is accomplished as follows:

When during downward movement of thee stepped operating piston 50, the projecting portion 71 of piston rod 52 engages the actuator of the switch 69, the electronic control means 28 receives a corresponding pulse indicating the position of the stepped operating piston 50. When clutch 2 is disengaged, as described above, control valve 22 is shifted back from position II to the normal position I, and since control valve 25 is still in the position I, pressure fluid from pressure chamber 60 can be discharged through conduit 21, control valve 22, 25 and conduit 76 to the low pressure region of container 76a. The reduction of pressure in the pressure chamber 60, permits spring 56 to push operating piston 50 back into the chamber 60 in a rapid movement. When projecting portion 71 of operating piston 50,51,52 engages the actuator of switch 70, a signal is given to the electronic control means 28 through the cable 72 so that the control means 28 generates a pulse to the electromagnetic shifting means 25a of the second control valve 25 whereby control valve 25 is shifted to the control position II. This ends the rapid movement of clutch 2 to the engaged position, since piston portion 51, pressing the fluid out of chamber 60, has to force the fluid through control valve 25 in position II and through the throttle 27 into the discharge conduit 76, and due to the throttle 27 the movement of piston 50 and of the clutch are slowed down so that the two clutch parts smoothly engage.

When piston portion 51 with nut 54 again engages nut 40 and is stopped, the actuator of switch 68 is operated and transmits a signal indicating the end position of the operating piston 50 to the electronic control means 28 which generates a pulse for shifting control valve 25 back to the normal position I. Successive gear shift operation toward higher gear stages are carried out in the same manner, with selector lever 100 remaining in the position for shifting up.

For shifting the gear transmission down in an automatic operation under the control of control means 28, selector lever 100 is turned to the position corresponding to downward shifting and the respective actuated selector switch 101 transmits a signal to the control means 28. When the gas supply is interrupted by the operator, electronic control means 28 transmits a signal to the electromagnetic shifting means 22a of control valve 22 which is shifted to the control position II so that pressure fluid from the pump 24 enters the pressure chamber 60, and rapidly moves the stepped operating piston 50 downward against the action of spring 56 so that fluid flows from pressure chamber 61 and through opening 14 and conduit 13 into the clutch cylinder 12 so that clutch 2 is quickly disengaged. The gear shift lever, not shown, is operated whereupon it is necessary to engage clutch 2 as quickly as possible. During the downward movement of the stepped operating piston 50, 52, switch 69 is closed by projection 71 but causes the electronic control means 28 to transmit a signal to electromagnetic shifting means 22a whereby the control valve 22 is shifted to the normal position I.

Both control valves 22, 25 are now in the respective positions I, so that the pressure fluid can rapidly flow out of the pressure chamber 60 due to the fact that throttle 27 is not effective. In this manner, the clutch is rapidly closed and engaged after a gear shift operation to a lower gear stage. Thereupon the gas pedal, not shown, is operated by the driver, and after obtaining of synchronism between the gears of the transmission, the transmission is shifted to the next lower gear stage. During the automatic shifting operations, the stepped piston 37 remains in its upper position, abutting a shoulder 47 of housing 32. However, the automatic clutch operations can be overruled at any time by operation of clutch pedal 19 by the driver. When clutch pedal 19 is depressed, actuator 29 of switch 30 is operated so that the electronic control means 28 is disconnected in the same manner as described for the first shifting operation from neutral to the first gear stage.

The valve 42 serves the purpose of replacing leakage losses in the conduit 17 and master cylinder 18. This is automatically effected when the pressure chamber 60 is supplied with pressure fluid by valve 22 in the position II. The high pressure in the pressure chamber 60 urges valve body 42 upwards against the action of spring 44 so that it is lifted off the annular seat 43 and permits pressure fluid to enter the pressure chamber 49 and conduit 17.

Clutch 2 is subject to a certain wear so that the distance varies which the clutch pedal 19 has to move when operated by the driver. The valve body 63 is provided for compensating the greater distance which the clutch 2 has to move due to wear. The increased volume of clutch cylinder 11 is not compensated by an accordingly increased distance of movement of the operating pistons 50, but valve body 63 opens so that fluid is discharged through the conduit 62 into the space 67 and into the low pressure container 75. This discharge occurs every time when the operating piston 50 moves to its upper end position in which valve body 63 is lifted off its seat 64 by spring 65 due to the higher position of bushing 58.

Since the control chamber 67 is filled with pressure fluid, the switches 68, 69, 70 are protected from condensates and corrosion, and sparking is prevented.

It is possible to substitute for switch 70, a timing device controlling the control valve 25. From the above description, it is apparent that the clutch 2 can be operated under complete control of the driver by means of the clutch pedal 19, and also automatically by control means 28 and the control valve means 22, 25.

It will be understood that each of the elements described above, or two or more together, may also find a useful application in other types of clutch control apparatus for a motor car differing from the types described above.

While the invention has been illustrated and described as embodied in a clutch control apparatus permitting automatic operation of a clutch during shifting of gears of a motor car, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Clutch control apparatus for a motor car, comprising, in combination, clutch means biased to an engaged position; a clutch cylinder and a clutch piston for moving said clutch means to a disengaged position; operator controlled clutch actuating means; a master cylinder and a master piston operable by said clutch actuating means; operating valve means including biased operating piston means, and operating cylinder means communicating with said master cylinder and said clutch cylinder so that upon operation of said master piston by said clutch actuating means said clutch piston operates said clutch means to move to said disengaged position; a source of pressure fluid; control valve means having a normal position disconnecting said source from said operating cylinder means and connecting the latter with a low pressure region, and a first control position connecting said source with said operating cylinder means so that said biased operating piston means rapidly presses fluid into said clutch cylinder for rapidly disengaging said clutch means; and control means for moving said control valve means to said first control position for disengaging said clutch means, and then to said normal position so that low pressure in said operating cylinder means permits said biased operating piston to draw fluid from said clutch cylinder means so that said clutch means moves rapidly to said engaged position.

2. Control apparatus as claimed in claim 1 comprising relief throttle means; wherein said control valve means have a second control position connecting said operating cylinder means with said relief throttle means so that said clutch means moves slowly to said engaged position; wherein said control means includes switch means operated by said operating piston means; wherein said control valve means include electromagnetic shifting means controlled by said switch means to shift said control valve means between said positions thereof.

3. Control apparatus as claimed in claim 2 wherein said control valve means includes a first control valve and a second control valve having normal positions disconnecting said source from said operating cylinder means and together connecting said operating cylinder means with said low pressure region; wherein said first control valve has a working position for connecting said source with said operating cylinder means; and wherein said second control valve has a working position for connecting said operating cylinder means with said relief throttle means; and wherein each of said first and second control valves has said electromagnetic shifting means.

4. Control apparatus as claimed in claim 1 wherein said operating piston means includes two stepped operating pistons forming in said operating cylinder means first, second, and third pressure chambers; wherein said first pressure chamber communicates with said master cylinder; wherein said second pressure chamber is located between said two operating pistons and communicates with said control valve means; and wherein said third pressure chamber communicates with said clutch cylinder.

5. Control apparatus as claimed in claim 1 wherein said operating valve means includes a housing secured to one end of said operating cylinder means and forming with the same a control chamber into which a piston rod portion of one of said operating piston means projects; wherein said control valve means have electromagnetic shifting means; and wherein said control means include switch means for controlling said electromagnetic shifting means, located in said control chamber and actuated by said piston rod portion.

6. Control apparatus as claimed in claim 1 wherein control means include electronic means; and wherein said operator controlled clutch actuating means include a biased clutch pedal, for actuating said master piston so that fluid flowing through said operating cylinder means operates said clutch means, and a switch operated by said clutch pedal to disconnect said electronic means of said control means so that said control valve means are inoperative during operator controlled actuation of said clutch pedal and clutch means.

7. Control apparatus as claimed in claim 1 wherein said biased operating piston means include two operating pistons, and a spring means abutting said operating cylinder means and urging one of said operating pistons into abutment with the other operating piston for movement together when the pressure in said operating cylinder means is reduced in said normal position of said control valve means.

8. Control apparatus as claimed in claim 1 wherein said operating piston means includes two stepped operating pistons forming in said operating cylinder means first, second, and third pressure chambers; wherein said first pressure chamber communicates with said master cylinder; wherein said second pressure chamber is located between said two operating pistons and communicates with said control valve means; wherein said third pressure chamber communicated with said clutch cylinder; and wherein one of said operating pistons which is located between said first and second pressure chambers, includes a biased valve connecting said first and second pressure chambers and opening toward said first pressure chamber.

9. Control apparatus as claimed in claim 1 wherein said operating valve means includes a housing secured to one end of said operating cylinder means and forming with the same a control chamber into which a piston rod portion of one of said operating pistons projects; wherein said control valve means have electromagnetic shifting means; wherein said control means include switch means for controlling said electromagnetic shifting means, located in said control chamber and actuated by said piston rod portion; wherein said operating piston means includes two stepped operating pistons forming in said operating cylinder means first, second, and third pressure chambers; wherein said first pressure chamber connunicates with said master cylinder; wherein said second pressure chamber is located between said two operating pistons and communicates with said control valve means; wherein said third pressure chamber communicates with said clutch cylinder; and including a biased valve in a conduit passing through a transverse wall of said housing separating said third pressure chamber from said control chamber, said biased valve opening said conduit when one of said operating pistons moves away from said wall, and closing said conduit when said one operating piston is pressed against said wall.

10. control apparatus as claimed in claim 1 wherein said biased operating piston means includes an operating piston and a spring means biasing said operating piston to press fluid from said operating cylinder means into said master cylinder, and to draw fluid from said clutch cylinder into said operating cylinder means.

* * * * *